United States Patent [19]

Watari

[11] Patent Number: 4,548,784
[45] Date of Patent: Oct. 22, 1985

[54] NUCLEAR REACTOR POWER CONTROL SYSTEM

[75] Inventor: Yoshio Watari, Katsuta, Japan

[73] Assignee: Hitachi, Ltd., Tokyo, Japan

[21] Appl. No.: 292,586

[22] Filed: Aug. 13, 1981

[30] Foreign Application Priority Data

Aug. 22, 1980 [JP] Japan .................... 55-114800

[51] Int. Cl.$^4$ .............................................. G21C 7/00
[52] U.S. Cl. ..................................... 376/216; 376/219
[58] Field of Search .................... 376/216, 217, 219

[56] References Cited

U.S. PATENT DOCUMENTS

| 4,069,097 | 1/1978 | Frank | 376/217 |
| 4,318,778 | 3/1982 | Musick | 376/216 |
| 4,333,797 | 6/1982 | Nishizawa | 376/217 |
| 4,337,118 | 6/1982 | Sakurai | 376/216 |

FOREIGN PATENT DOCUMENTS 53-46594   4/1978   Japan .

Primary Examiner—Donald P. Walsh
Attorney, Agent, or Firm—Antonelli, Terry & Wands

[57] ABSTRACT

In a nuclear reactor power control system, when a control rod or a safety rod drops into a nuclear reactor by a failure of a control rod drive mechanism, a power of a summing and averaging circuit which sums and averages measurements of neutron detectors is smaller than a value A preset by an operator of the nuclear reactor. The averaged value of the neutron detector outputs is compared with the preset value A, and if the difference therebetween exceeds a preset limit signal level B for the output drop, automatic withdrawal of the control rod is stopped, and if the difference is smaller than the limit signal level B for the power drop, the control rod is withdrawn by the amount corresponding to the power drop.

8 Claims, 7 Drawing Figures

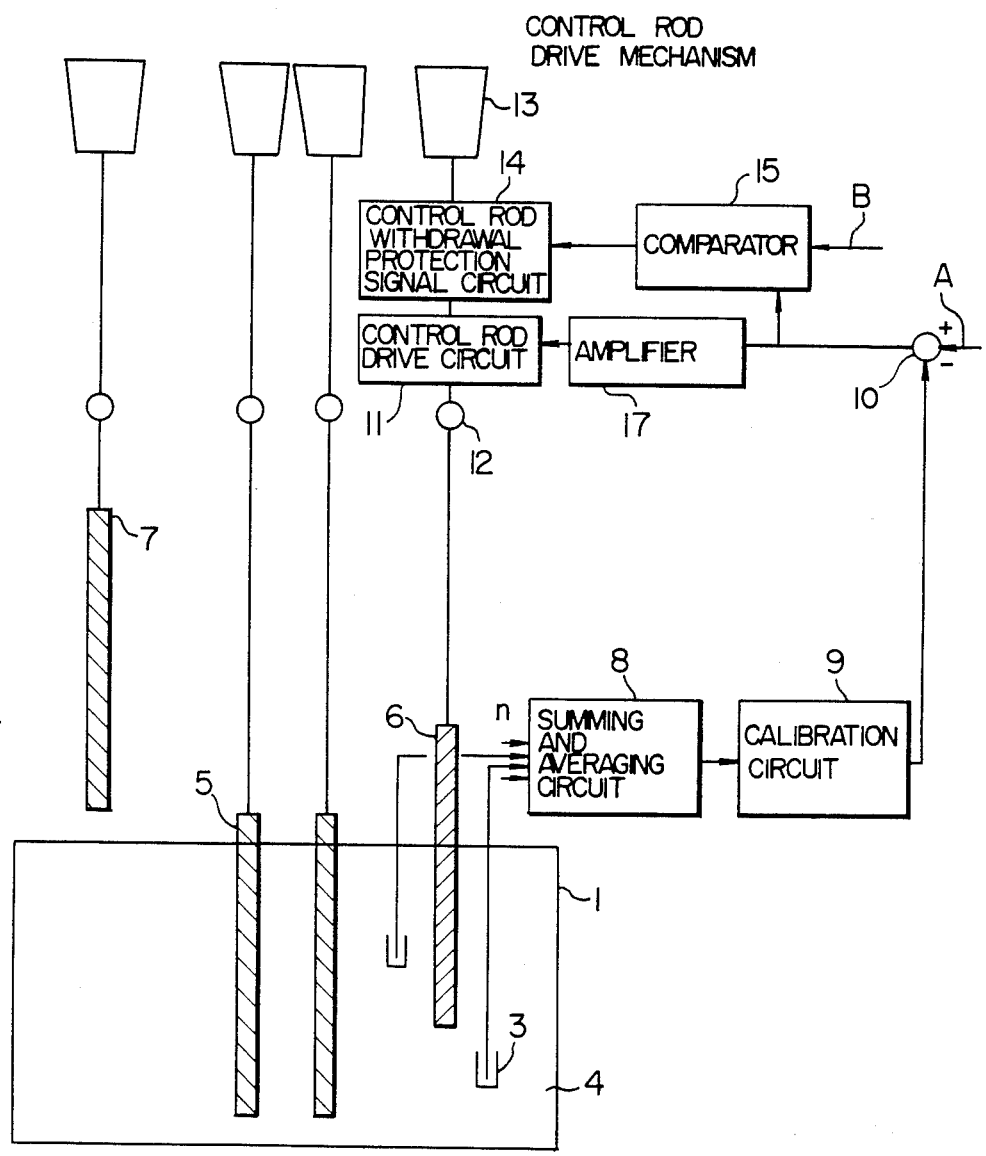
F I G. 2

NUCLEAR REACTOR POWER CONTROL SYSTEM

The present invention relates to a nuclear reactor power control system, and more particularly to a system for automatically controlling a power level of a nuclear reactor.

In a prior art control system for a power distribution or a power level such as that disclosed in Japanese Patent Application Laid-Open No. 46594/78, signals from power detectors uniformly distributed in a nuclear reactor are summed and averaged and the averaged signal is fed back to automatic power control rods to control the power. In such a nuclear reactor which uses such a power control system, when a safety rod or a power control rod is inserted during the operation by reason of drop of a control rod or another, the power of the nuclear reactor is abruptly reduced and then the power recovers as a result of the withdrawal of the automatic power control rod by the action of the power control system. When the above power control takes place, the power is raised by the automatic power control rods over the entire area of the reactor so that the power distribution exhibits a large distortion such that the area at which the insertion accident of the safety rod or the control rod has taken place shows a low power distribution while the other areas show a high power distribution. As a result, thermal limitations such as maximum linear heat generating rate and minimum critical heat flux ratio may exceed design limitations for the high power area and fuel may become molten and fail.

It is an object of the present invention to provide a power control system which can assure safe operation of a nuclear reactor even when the power is reduced by an accident or improper operation.

According to a feature of the present invention, a nuclear reactor power control system is provided with a withdrawal protection function to prevent the movement of the automatic power control rod by the power control system when the power is reduced below a predetermined level by some reason.

The inventor of the present invention considered that the insertion of the safety rods or the power control rods into the nuclear reactor when the accident or the improper operation takes place results in a local reduction of the power level due to one to several safety rods or control rods, the increase of the power by the withdrawal of the control rods is improper and that it is proper to stop the automatic power control movement when the power is reduced with a remarkable unbalance in the power distribution.

According to the present invention, even if the control rods or the safety rods drop into the nuclear reactor during the operation of the nuclear reactor, the rise of the reactor power level which prevents the integrity of fuel is avoided, and a highly safe nuclear reactor is provided.

In the drawings:

FIG. 2 is a longitudinal sectional view of the nuclear reactor of FIG. 1 and a power control system for the nuclear reactor;

Figure 5:
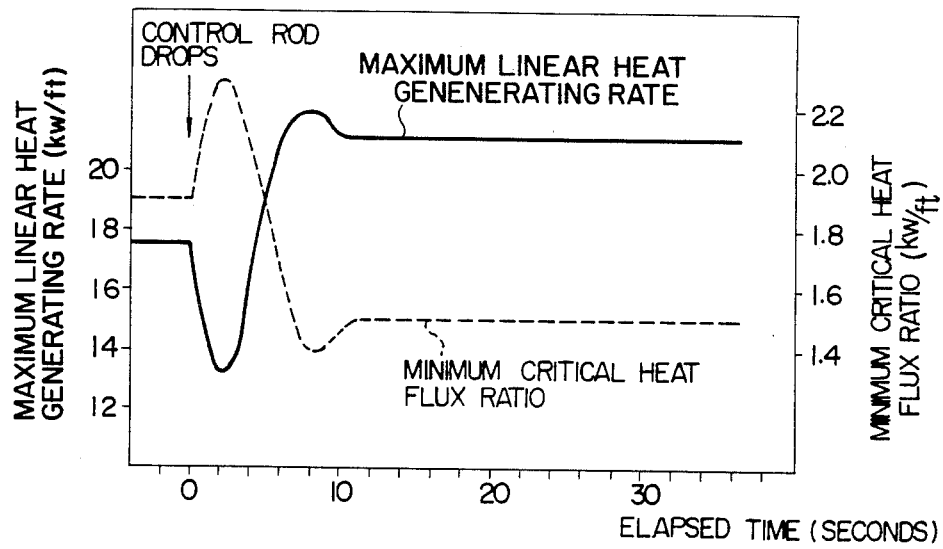
Figure 3:
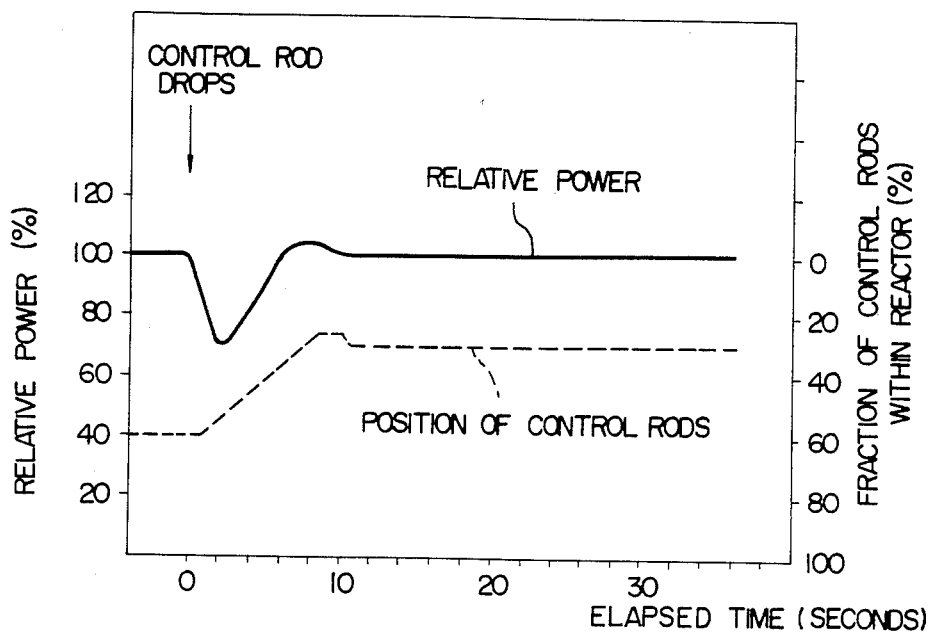
Figure 4:
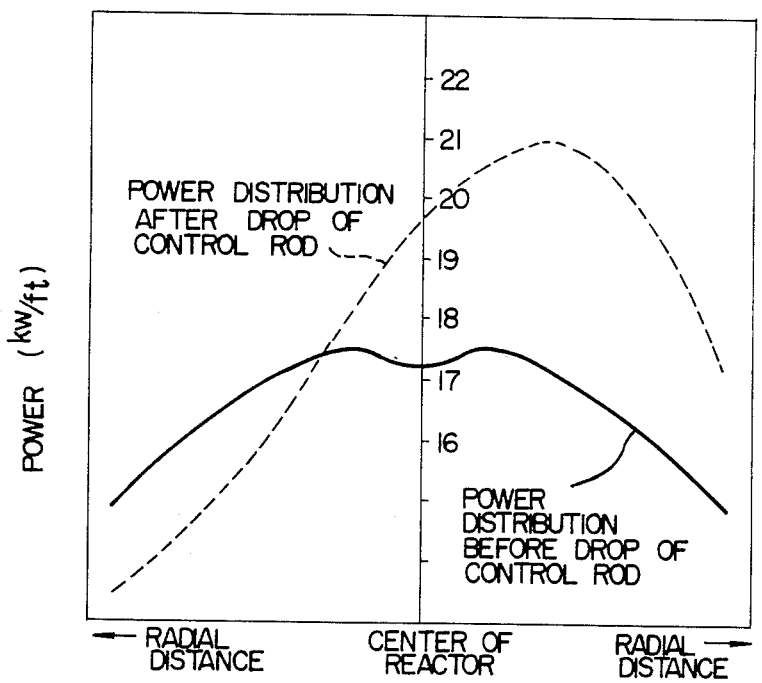
Figure 6:
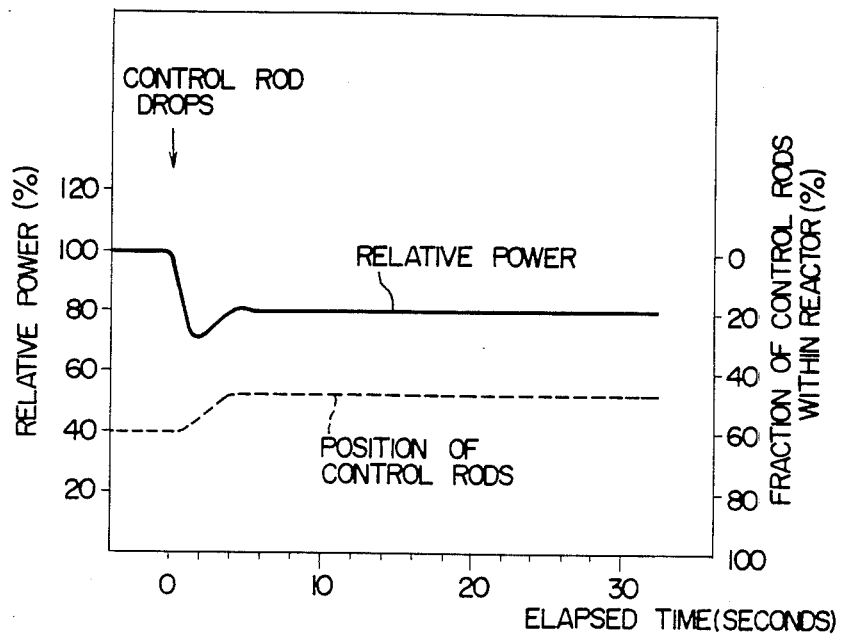
Figure 7:
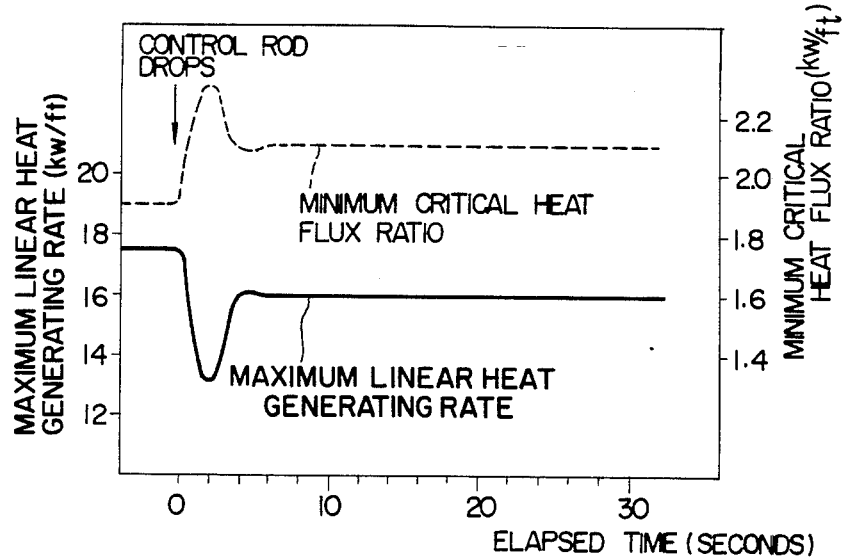

FIGS. 3 to 5 show changes in time in a nuclear reactor power and a position of an automatic power control rod and transitional changes in a maximum linear heat generating rate and a minimum critical heat flux ratio, and radial power distributions of the nuclear reactor power before and after the drop of the control rod, respectively, when a control rod is dropped and when the automatic power control is operated, that is, when a prior art technique is used; and FIGS. 6 and 7 show changes in time in the nuclear reactor power and the position of the automatic power control rod, and transitional changes in the maximum linear heat generating rate and the minimum critical heat flux ratio, when the control rod is dropped in the embodiment of the present invention.

Figure 1:
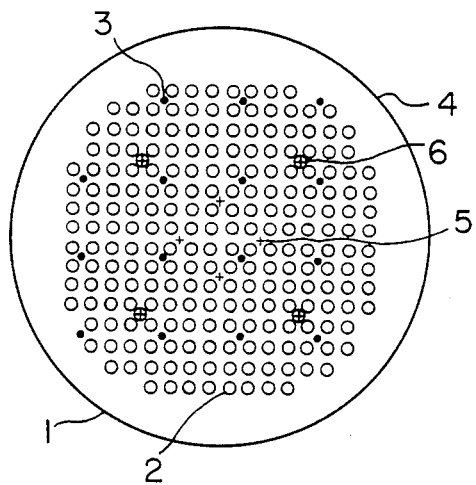
FIG. 1 is a cross-sectional view of a pressure tube type nuclear reactor.

The power control system of the present invention applied to a pressure tube type nuclear reactor is now explained below. FIG. 1 shows a cross-sectional view of the nuclear reactor. A number of pressure tubes 2 are arranged in the nuclear reactor core tank 1. While not shown, all of the pressure tubes 2 have a calandria tube and fuel assemblies. In order to measure a power of the reactor, neutron detectors 3 are mounted between the pressure tubes 2 at several points in a heavy water moderator region 4 in the reactor core tank 1. Power flattening control rods 5 for averaging the power distribution of the reactor and automatic power control rods 6 for automatically controlling the power level of the nuclear reactor based on the measurement by the neutron detectors 3 are disposed in the nuclear reactor.

FIG. 2 shows a longitudinal sectional view of the nuclear reactor. In addition to the power flattening control rods 5 and the automatic power control rods 6 described above, a safety rod 7 for emergency shutdown of the nuclear reactor in case of an accident of the nuclear reactor is provided as a control rod. The control rods 5 and 6 and the safety rod 7 are all inserted between the pressure tubes 2 to reduce the power. Signals from the detectors 3 uniformly distributed within the heavy water moderator 4 are summed and averaged in a summing and averaging circuit 8 and calibrated in a calibration circuit 9 with a thermal output of the nuclear reactor determined by a periodic thermal heat balance calculation.

In a normal operation, this signal is compared in a sampling adjuster 10 with a preset nuclear reactor power signal A requested by an operator of the nuclear reactor. Assuming that the former signal is positive and the latter signal is negative, when a differential signal amplified by an amplifier 17 is positive, a control rod drive circuit 11 produces a control rod withdrawal signal so that the automatic power control rods 6 are withdrawn from the reactor by a control rod drive mechanism 13 and a control rod drive motor 12 until the signal reaches zero. If the difference between the positive signal and the negative signal is negative, the automatic power control rods 6 are inserted into the reactor so that the power level of the nuclear reactor is automatically controlled to the predetermined level.

If the safety rod 7 drops into the nuclear reactor tank 1 by some reason, for example, by an improper operation or a failure in the control rod drive mechanism 13, the signal of the summing and averaging circuit 8 which sums and averages the signals from the nuclear detectors 3 becomes smaller than the signal A (e.g. 100% output) preset by the operator of the nuclear reactor. A difference between the averaged measurement of the nuclear detectors and the preset level A is compared in a comparator 15 with a critical signal level B (e.g. 5% output) for a power reduction which is also preset by the operator of the nuclear reactor. Only when the difference is larger than the preset level B, the control rod withdrawal protection signal circuit 14 produces a control rod withdrawal protection signal to prevent the withdrawal of the automatic power control rods 6.

In the prior art control system which has no such control rod withdrawal protection means, the drop of the safety rod is compensated by the withdrawal of the automatic power control rods 6 so that the power level is automatically recovered to the original 100% power level.

FIG. 3 shows a change in the nuclear reactor power and a change in position of the automatic power control rods 6. In FIG. 3, it is assumed that an accident of the drop of the control rod such as the safety rod into the nuclear reactor takes place at a time zero (second). In this case, the nuclear reactor power drops to a 75% power level in two seconds from the occurrence of the accident. As a result, the average of the signals from the detectors 3 shown in FIG. 3 becomes smaller than the preset level A (100% output) for the power of the nuclear reactor and the automatic power control rods 6 are withdrawn from the nuclear reactor 0.5 second after the occurrence of the accident due to a time delay in the calibration circuit 9 so that the power recovers to its original level (100% output) in approximately ten seconds.

However, the power distribution in the nuclear reactor is not flattened in this case and the maximum linear heat generating rate which is no more than 17.5 kw/ft in order to prevent the fuel in the nuclear reactor from becoming molten and the minimum critical heat flux ratio which is no less than 1.9 in order to prevent the cladding from being burnt out change. Consequently, when the control rod (including the safety rod) other than the optimum designed power flattening control rod is inserted into the nuclear reactor, the power distribution results in a large distortion as shown by a broken line in FIG. 4, in which the area at which the drop accident has taken place shows a low power distribution and the other areas show a high power distribution. As a result, the heat limitations such as the maximum linear heat generating rate and the minimum critical heat flux ratio exceed the design limits at the high power areas and the fuel may become molten and fail.

FIG. 5 shows changes in time of the maximum linear heat generating rate and the minimum critical heat flux ratio as the control rod drops. As a result of the reduction of the power by the drop of the control rod such as the safety rod 7, the maximum linear heat generating rate becomes small and the minimum critical heat flux ratio becomes large for about one second after the accident. The power thereafter increases to compensate for the reduction of the power in the low power area as shown in FIG. 3 so that the maximum linear heat generating rate in the high power area changes largely while the minimum critical heat flux ratio changes in a small amount. Those values overshoot and undershoot, respectively, approximately nine seconds after the accident, and when the nuclear reactor output recovers to the 100% power level, the maximum linear heat generating rate assumes a value of 21 kw/ft and the minimum critical heat flux ratio assumes a value of 1.5. The reason why those values are larger and smaller than the pre-accident values 17.5 kw/ft and 1.9, respectively, is because the power distribution is remarkably distorted by the drop of the control rod.

On the other hand, when the withdrawal of the control rod is protected in accordance with the embodiment of the present invention, the nuclear reactor power and the position of the automatic power control rods change as shown in FIG. 6 when the control rod drops into the nuclear reactor. In FIG. 6, as the control rod drops, the power is reduced from 100% power to 75% power in a short time (approximately two seconds). However, since the amount of reduction (25%) is larger than the preset amount B (5% power), the automatic power control rods 6 are withdrawn only by the amount corresponding to the time delay in the comparator 15 and the calibrator 9, when the withdrawal of the automatic power control rods 6 is protected by the control rod withdrawal protection signal. As a result, the recovery of the nuclear reactor power level stops at 80% power level. Consequently, even if the power distribution of the nuclear reactor is distorted as shown by the broken line in FIG. 4 by the drop of the control rod, the power level recovers only to as much as 80% and hence the maximum linear heat generating rate for the heat factors rises only to 16 kw/ft as shown in FIG. 7. Similarly, the minimum critical heat flux ratio falls only to 2.1. Since those values satisfy the limitations of no more than 17.5 kw/ft and no less than 1.9, the integrity of the fuel is maintained.

The preset level B is determined taking an external disturbance of the nuclear reactor into consideration because it is necessary that the automatic power control fully functions for the external disturbance which may occur during a normal operation of the nuclear reactor and which does not disturb the operation of the nuclear reactor. Thus, an effective value for the preset level B is 5%. With such a preset level, the withdrawal of the control rod is not prevented by the external disturbance, provided that an abnormal condition of the control rod per se such as the drop of the control rod does not take place. If a response value of the dropped control rod is so small that the power changes only as much as five percent when the control rod drops, the power level recovers to the original 100% power level by the withdrawal of the automatic power control rods. In this case, however, since the response value of the dropped control rod is small, the distortion in the power distribution when the control rod drops is small and the integrity of the fuel is maintained.

While the safety rod was assumed as the control rod which may drop in the description set forth above, it should be understood that the control rod may be the power flattening control rod or liquid poison.

The means for automatically controlling the power level of the nuclear reactor may be concentration control of liquid poison included in the heavy water moderator. In this case, the function of a liquid poison remover may be stopped when the power level is lowered below the preset level B.

I claim:

1. A nuclear reactor power control system comprising:
   a plurality of fuel rods;
   a control rod for flattening a fuel power distribution;
   a control rod for controlling a power level;
   a safety rod for reducing the power in case of emergency;
   a plurality of neutron detectors for detecting the power;
   a sampling adjuster for receiving power signals from said neutron detectors and comparing them with a preset power level signal to produce a difference signal therebetween;

control rod drive means responsive to the difference signal from said sampling adjuster to drive said control rods for controlling the power level;

means for detecting the drop of said control rod for flattening the fuel power distribution or said safety rod for reducing the power in case of emergency; and means responsive to the detection of the drop to stop the drive by said control rod drive means for controlling the power level.

2. A nuclear reactor power control system according to claim 1 wherein said sampling adjuster comprises a combination of a summing and averaging circuit and a comparator.

3. A system for controlling the power of a nuclear reactor having a reactor core, the system comprising:

means disposed in said reactor core for controlling the power of said nuclear reactor;

a plurality of neutron detectors disposed in said reactor core;

means responsive to the outputs of said neutron detectors for providing a power signal representative of the power of said reactor;

means for comparing said power signal with a reactor power preset value to provide a difference signal therebetween;

means responsive to said difference signal for adjusting the controlling ability of said power controlling means so that said power signal is equal to said reactor power preset value;

means responsive to said difference signal to produce a detection signal when said power signal is reduced to less than a threshold value identical with said reactor power preset value minus a predetermined value; and means responsive to said detection signal for disabling said adjusting means.

4. A system according to claim 3, wherein said means for controlling the power of said nuclear reactor includes control rods.

5. A system according to claim 3 or 4, wherein said threshold value identical with said reactor power preset value minus a predetermined value is representative of 95% of the reactor power corresponding to said reactor power preset value.

6. A system according to claim 3, wherein said means for controlling the power of said nuclear reactor includes liquid poison.

7. A system for controlling the power of a nuclear reactor having a reactor core, the system comprising:

a plurality of control rods disposed in said reactor core for controlling the power of said nuclear reactor;

a plurality of neutron detectors disposed in said reactor core;

means responsive to the outputs of said neutron detectors for providing a power signal representative of the power of said reactor;

means for comparing said power signal with a reactor power preset value to provide a difference signal therebetween;

means responsive to said difference signal for driving said control rods to adjust the lengths of those portions of said control rods which are within said reactor core so that said power signal is equal to said reactor power preset value;

means responsive to said difference signal to produce a detection signal when said power signal is reduced to less than a threshold value identical with said reactor power preset value minus a predetermined value; and means responsive to said detection signal for preventing said driving means from driving said control rods.

8. A system according to claim 7, wherein said threshold value identical with said reactor power preset value minus a predetermined value is representative of 95% of the reactor power corresponding to said reactor power preset value.

* * * * *